(12) United States Patent
Cowles et al.

(10) Patent No.: US 11,878,932 B2
(45) Date of Patent: Jan. 23, 2024

(54) METHODS FOR MELTING REACTIVE GLASSES AND GLASS-CERAMICS AND MELTING APPARATUS FOR THE SAME

(71) Applicant: CORNING INCORPORATED, Corning, NY (US)

(72) Inventors: Curtis Richard Cowles, Corning, NY (US); Gilbert De Angelis, Lindley, NY (US); Nicolas LeBlond, Painted Post, NY (US); David John McEnroe, Wellsville, NY (US); Jeffrey Lee Merriman, Corning, NY (US); Rand Alan Murnane, Big Flats, NY (US); Katherine Rose Rossington, Corning, NY (US); Michael Joshua Snyder, Almond, NY (US)

(73) Assignee: CORNING INCORPORATED, Corning, NY (US)

( * ) Notice: Subject to any disclaimer, the term of this patent is extended or adjusted under 35 U.S.C. 154(b) by 12 days.

(21) Appl. No.: 17/751,132

(22) Filed: May 23, 2022

(65) Prior Publication Data
US 2022/0274860 A1 Sep. 1, 2022

Related U.S. Application Data

(62) Division of application No. 16/321,898, filed as application No. PCT/US2017/044833 on Aug. 1, 2017, now Pat. No. 11,370,685.
(Continued)

(51) Int. Cl.
C03B 5/235 (2006.01)
C03B 5/44 (2006.01)
C03B 3/00 (2006.01)

(52) U.S. Cl.
CPC ............ *C03B 5/2356* (2013.01); *C03B 3/005* (2013.01); *C03B 5/44* (2013.01); *C03B 2211/23* (2013.01); *C03B 2211/70* (2013.01)

(58) Field of Classification Search
CPC ........... C03B 5/26; C03B 5/44; C03B 5/2356; C03B 7/005; C03B 7/06
See application file for complete search history.

(56) References Cited

U.S. PATENT DOCUMENTS 3,237,929 A 3/1966 Emile et al.
3,260,587 A 7/1966 Dolf et al.
(Continued)

FOREIGN PATENT DOCUMENTS

CN 87105523 A 6/1988
CN 1367761 A 9/2002
(Continued)

OTHER PUBLICATIONS

Chinese Patent Application No. 201780049315.7, Office Action dated Dec. 30, 2021, 17 pages (4 pages of English Translation and 13 pages of Original Document), Chinese Patent Office.
(Continued)

*Primary Examiner* — Cynthia Szewczyk
(74) *Attorney, Agent, or Firm* — Travis B. Gasa; Payal A. Patel; Michael A. Hood

(57) ABSTRACT

A method of melting glass and glass-ceramics that includes the steps: conveying a batch of raw materials into a submerged combustion melting apparatus, the melting apparatus having liquid-cooled walls and a floor; directing a flame into the batch of raw materials and the melted batch with sufficient energy to form the raw materials into the melted batch; and heating a delivery orifice assembly in the floor of the submerged melting apparatus to convey the melted batch through the orifice assembly into a containment vessel. The
(Continued)

melted batch has a glass or glass-ceramic composition that is substantially reactive to a refractory material comprising one or more of silica, zirconia, alumina, platinum and platinum alloys.

12 Claims, 6 Drawing Sheets

Related U.S. Application Data

(60) Provisional application No. 62/370,013, filed on Aug. 2, 2016.

(56) References Cited

U.S. PATENT DOCUMENTS

| | | | |
|---|---|---|---|
| 3,420,938 A * | 1/1969 | Ekdahl | C03B 5/26 373/84 |
| 3,436,203 A | 4/1969 | Wu | |
| 3,640,517 A | 2/1972 | Sendt | |
| 3,790,360 A | 2/1974 | Kato et al. | |
| 4,366,571 A | 12/1982 | Palmquist | |
| 5,367,532 A | 11/1994 | Boen et al. | |
| 5,643,350 A | 7/1997 | Mason et al. | |
| 5,709,723 A | 1/1998 | Gearing | |
| 5,939,016 A | 8/1999 | Mathiesen et al. | |
| 6,883,349 B1 | 4/2005 | Jeanvoine | |
| 7,886,935 B2 | 2/2011 | Lasko | |
| 8,769,992 B2 | 7/2014 | Huber | |
| 2002/0116952 A1 | 8/2002 | Singer | |
| 2005/0279275 A1 | 12/2005 | Holder | |
| 2006/0105899 A1 | 5/2006 | Jacques et al. | |
| 2008/0256981 A1 | 10/2008 | Jacques et al. | |
| 2010/0126223 A1 | 5/2010 | Thomas | |
| 2013/0327092 A1 | 12/2013 | Charbonneau | |
| 2014/0144185 A1 | 5/2014 | Shock et al. | |
| 2015/0307382 A1 | 10/2015 | Wang et al. | |
| 2017/0284872 A1 | 10/2017 | Cowles et al. | |

FOREIGN PATENT DOCUMENTS

| | | | |
|---|---|---|---|
| CN | 102471115 A | 5/2012 | |
| EP | 0692678 A1 | 1/1996 | |
| EP | 2530057 A2 * | 12/2012 | ............. C03B 5/027 |
| GB | 1310603 A | 3/1973 | |
| JP | 5521285 B2 | 6/2014 | |
| SU | 808383 A1 | 3/1981 | |
| WO | 01/58816 A1 | 8/2001 | |
| WO | 2016/029085 A2 | 2/2016 | |

OTHER PUBLICATIONS

Chinese Patent Application No. 201780049315.7, Office Action dated Jun. 17, 2021, 12 pages (5 pages of English Translation and 7 pages of Original Document), Chinese Patent Office.
Fan et al., "Thermal equipment and thermal measurement for glass industry", in Wuhan University of Technology Press, 1993, 4 pages.
Hongjiu Ren et al., "Non ferrous metal bath melting", Metallurgy Industry Press, 2001, 4 pages. (1 page of English translation and 3 pages of Original Document).
International Search Report and Written Opinion of the International Searching Authority; PCT/US2017/044833; dated Nov. 7, 2017; 14 Pages; European Patent Office.
Liu et al., "Inorganic nonmetallic materials technology", in Chinese Academy of Sciences Press, 2015, 3 pages.
Quan et al., "Handbook of environmental engineering calculations", SINOPEC Press, 2003, 3 pages. (I page of English translation and 2 pages of Original Document).

* cited by examiner

METHODS FOR MELTING REACTIVE GLASSES AND GLASS-CERAMICS AND MELTING APPARATUS FOR THE SAME

CROSS-REFERENCE TO RELATED APPLICATIONS

This application is a divisional of U.S. patent application Ser. No. 16/321,898 filed on Jan. 30, 2019, which was the national stage application under 35 U.S.C. § 371 of International Application No. PCT/US2017/044833, filed on Aug. 1, 2017, which claims the benefit of priority to 35 U.S.C. § 119 of U.S. Provisional Application Ser. No. 62/370013 filed on Aug. 2, 2016, the contents of which are relied upon and incorporated herein by reference in their entirety.

BACKGROUND

The present disclosure relates generally to methods for melting glasses and glass-ceramics and melting apparatus for the same and, more particularly, to methods for melting reactive glasses and glass-ceramics and submerged combustion melting ("SCM") apparatus and delivery orifice assemblies for the same.

Many reactive glass and glass-ceramic compositions present significant challenges in developing melting processes suitable for use on a manufacturing scale. Although these compositions can degrade refractory and precious metal furnace linings, they often can be melted successfully in the laboratory or at a pilot scale. With smaller volumes of materials, it is possible to limit the exposure time of these compositions with furnace linings susceptible to corrosion when melting is conducted in the laboratory or at a pilot scale. Moreover, the relatively smaller size of the melting apparatus employed in the laboratory and at a pilot scale can make single-use furnace linings feasible from a cost standpoint when melting reactive glasses and glass-ceramics.

As the processing of reactive glass and glass-ceramic compositions is scaled to batches and volumes suitable for manufacturing, corrosion and degradation of furnace linings becomes a serious problem. Put simply, certain glass and glass-ceramic compositions will corrode and destroy furnace linings during melting and fining operations, particularly as exposure times at temperature must be increased to ensure homogeneity of the melt. For example, high copper-containing antimicrobial glass compositions are reactive with both refractory (e.g., materials consisting essentially of silica, zirconia, alumina and combinations thereof) and precious metal furnace lining materials. While high copper-containing antimicrobial glass can be melted successfully in the laboratory, manufacturing of this glass is cost-prohibitive as conventional melting approaches and apparatus cannot be employed to melt at high volumes.

Accordingly, there is a need for methods of melting reactive glasses and glass-ceramics, along with melting apparatus for the same, suitable for scaling to volumes suitable for manufacturing. There is also a need for methods and melting apparatus that minimize degradation and corrosion to furnace components in contact with reactive glasses and glass-ceramics during processing.

SUMMARY

An aspect of the disclosure pertains to a method of melting glass and glass-ceramics that includes the steps: conveying a batch of raw materials into a submerged combustion melting apparatus, the melting apparatus having liquid-cooled walls and a floor; directing a flame into the batch of raw materials and the melted batch with sufficient energy to form the raw materials into the melted batch; and heating a delivery orifice assembly within the floor of the submerged melting apparatus to convey the melted batch through the orifice assembly into a containment vessel. Further, the melted batch has a glass or glass-ceramic composition that is substantially reactive to a refractory material comprising one or more of silica, zirconia, alumina, platinum and platinum alloys.

In some embodiments of the method, the melted batch includes a skull layer in contact with the walls and the bottom of the submerged combustion melting apparatus. The skull layer developed during the method also can range in thickness from about 0.1 to about 5 inches in thickness.

In other embodiments of the method, the conveying, directing and heating steps are further controlled such that the melted batch is continuously conveyed or periodically conveyed into the containment vessel. The melted batch can be continuously conveyed into the containment vessel through a delivery orifice assembly by the heating step. Preferably, the orifice assembly is lined with a tin oxide liner element. It is also preferable to conduct the step of heating the delivery orifice with an induction heating process.

In another aspect, the conveying step can be conducted such that the batch of raw materials is conveyed below a glass line of the melted batch. In other aspects, the conveying step can be conducted such that the batch of raw materials is conveyed above a glass line of the melted batch.

In further embodiments of the method, the glass or glass-ceramic composition includes copper in the form of a copper-containing oxide. For example, the glass or glass-ceramic composition can be an antimicrobial glass composition comprising a copper-containing oxide that ranges from about 10 to about 50 mol %.

In an additional aspect of the method, the step of directing a flame into the batch of raw materials and the melted batch can be conducted with sufficient energy to agitate the melted batch such that the melted batch in the containment vessel is substantially homogeneous. The step of directing a flame can also be conducted according to a ratio of oxygen to fuel that is set based at least in part on an oxidation state of at least one metal (e.g., copper) in the glass or glass-ceramic composition. Further, the fuel employed in the step of directing a flame can be natural gas and the ratio of oxygen to natural gas can be set from about 2:1 to about 3:1.

Another aspect of the disclosure pertains to a delivery orifice assembly for a submerged combustion melting apparatus that includes: a susceptor sleeve comprising a sleeve end for coupling to a submerged melting apparatus; a coil surrounding the susceptor sleeve that is configured as an inductor and a liquid coolant conveyance; and an inner liner having a first refractory composition that is configured within the sleeve, the inner liner further configured to convey a melted batch from the melting apparatus and comprising a liner end in proximity to, or in contact with, the sleeve end. The melted batch has a glass or glass-ceramic composition. The delivery orifice assembly also includes a top cap positioned over the sleeve end and the liner end, the cap having the first refractory composition and configured for contact with the melted batch in the melting apparatus, and the cap further comprising an orifice substantially coincident with the liner end. The delivery orifice assembly further includes an induction heating controller coupled to the coil for inductively heating the susceptor to control flow of the melted batch through the orifice and the inner liner.

In an embodiment of the delivery orifice assembly, the glass or glass-ceramic composition is substantially reactive to a refractory material comprising one or more of silica, zirconia, alumina, platinum and platinum alloys. The glass or glass-ceramic composition can include copper in the form of a copper-containing oxide. For example, the glass or glass-ceramic composition can be an antimicrobial glass composition comprising a copper-containing oxide that ranges from about 10 to about 50 mol %.

In a further embodiment of the delivery orifice assembly, the first refractory composition can be selected from refractories consisting of quartz, tin oxide, chrome oxide, alumina, fused zirconia, zirconia, zirconia-silica, and combinations of these refractories. In a preferred aspect, the first refractory composition comprises tin oxide.

Another embodiment of the delivery orifice assembly is configured such that the susceptor sleeve has a composition selected from the group consisting of a steel, a precious metal and a precious metal alloy. Further, the susceptor sleeve can include an inner flange, configured such that the inner liner rests on this inner flange.

A further aspect of the disclosure pertains to a submerged combustion melting apparatus that includes: a melting vessel for preparing a melted batch, the vessel comprising a plurality of walls and a floor, each comprising a metal alloy and a water-cooling element; a port in one of the walls for conveying a batch of raw materials into the melted batch; a burner in the floor for directing a flame into the vessel with sufficient energy to form the melted batch; and a delivery orifice assembly in the floor for delivering the melted batch into a containment vessel. Further, the melted batch has a glass or glass-ceramic composition that is substantially reactive to a refractory material comprising one or more of silica, zirconia, alumina, platinum and platinum alloys.

In the aspect of the disclosure that pertains to a submerged combustion melting apparatus, the delivery orifice assembly can be configured according to any of the aspects of the delivery orifice assemblies outlined in the foregoing or consistent with the principles that animate them. For example, the first refractory composition can be selected from refractories consisting of quartz, tin oxide, chrome oxide, alumina, fused zirconia, zirconia, zirconia-silica, and combinations of these refractories. Further, the susceptor sleeve can have a composition selected from the group consisting of a steel, a precious metal and a precious metal alloy. The susceptor sleeve may also include an inner flange, configured such that the inner liner rests on this inner flange.

In another embodiment of the submerged combustion melting apparatus, the port is located at a position in one of the walls for conveying the batch of raw materials below a glass line of the melted batch. In other aspects, the port can be located at a position in one of the walls for conveying the batch of raw materials into the melted batch above its glass line.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
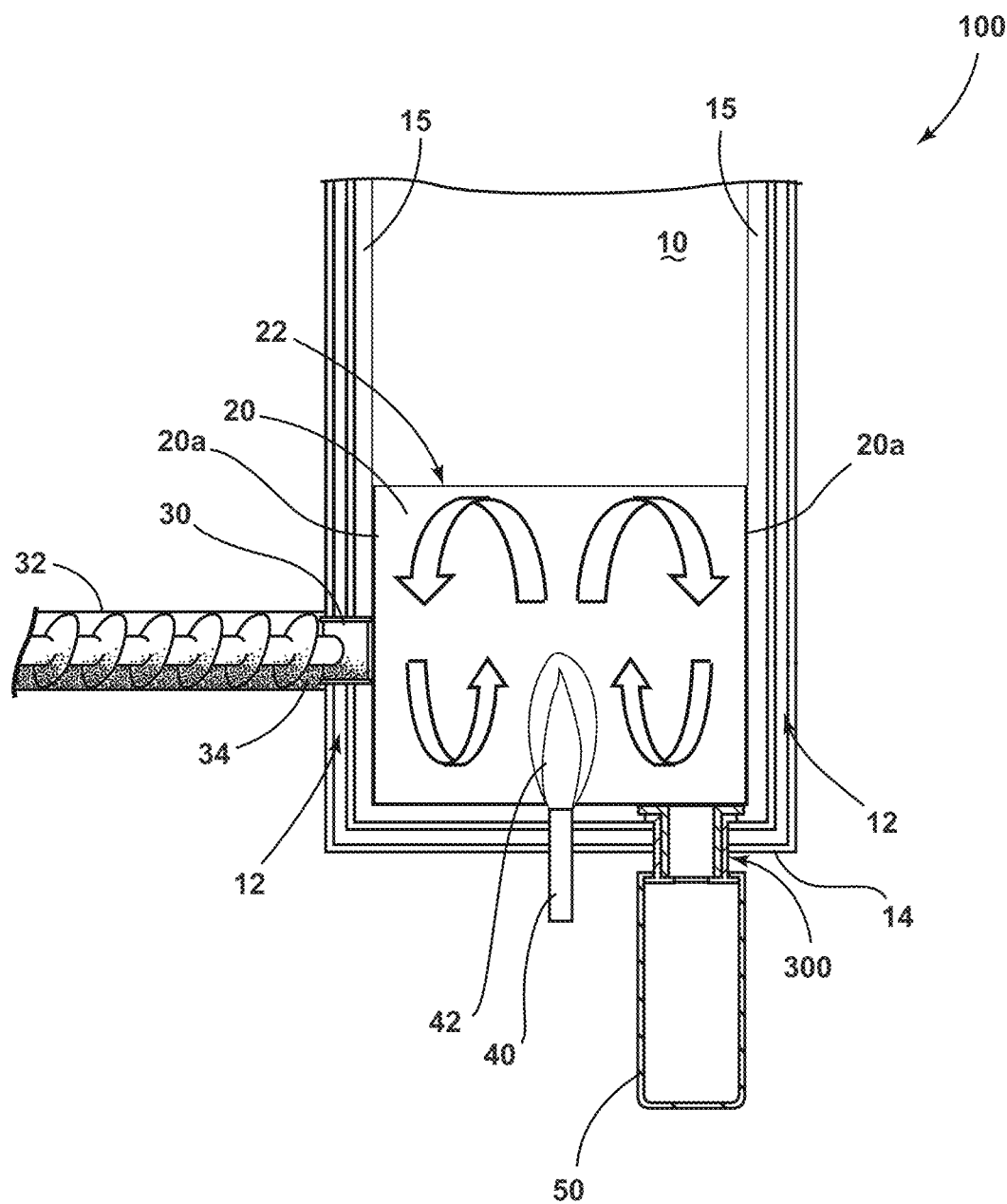
FIG. 1 is a schematic, cross-sectional view of a submerged combustion melting apparatus according to an aspect of the disclosure.

Reference will now be made in detail to various embodiment(s), examples of which are illustrated in the accompanying drawings.

Aspects of the disclosure generally pertain to methods of and apparatus for making copper-containing antimicrobial glass that include second phase particles comprising glass compositions with antimicrobial properties. The antimicrobial properties of the glasses disclosed herein include antiviral and/or antibacterial properties. As used herein, the term "antimicrobial" means a material, or a surface of a material, that will kill or inhibit the growth of bacteria, viruses and/or fungi. The term as used herein does not mean the material or the surface of the material will kill or inhibit the growth of all species of microbes within such families, but that it will kill or inhibit the growth of one or more species of microbes from such families.

As used herein, the term "log reduction" means—log $(C_a/C_0)$, where $C_a$=the colony form unit (CFU) number of the antimicrobial surface and $C_0$=the colony form unit (CFU) of the control surface that is not an antimicrobial surface. As an example, a "3 log" reduction equals about 99.9% of the bacteria, viruses and/or fungi killed. Similarly, a "5 log" reduction equals about 99.999% of bacteria, viruses and/or fungi killed.

Aspects of the disclosure generally pertain to methods of and apparatus for making glass and glass-ceramic compositions that are reactive to furnace linings and other furnace components comprising refractory materials. As used herein, "a glass or glass-ceramic composition that is substantially reactive to a refractory material" includes glass and glass-ceramic compositions that render, through corrosion, reaction, degradation or other contact, a conventional refractory material unusable after completion of one or more batch melting runs or periodic melting run time which totals an amount that is less than sufficient for cost-effective manufacturing of the glass and glass-ceramic compositions. Conventional refractory materials include, but are not limited to, refractory materials that include one or more of silica, zirconia, alumina, and precious metals that include one or more of platinum and platinum alloys.

Preferred glass or glass-ceramic compositions that are substantially reactive to a refractory material and suitable for melting according to the methods and/or with the melting apparatus of the disclosure include copper-containing, phase-separable antimicrobial glass compositions ("Cu-containing AM glass"). These Cu-containing AM glass compositions include those disclosed in U.S. Patent Application Publication No. 2015/0230476 ("US '476"), published on Aug. 20, 2015, the salient portions of which that are related to these compositions are hereby incorporated by reference in this disclosure in their entirety. Typically, the Cu-containing AM glass compositions in US '476 are high in copper content, preferably containing copper-oxide in the range from about 10 to about 50 mol % and silica in the range from about 40 to about 70 mol %. These compositions also typically contain a cuprite phase and a glass phase. Certain embodiments include a plurality of copper ions, a degradable phase including $B_2O_3$, $P_2O_5$ and $K_2O$, and a durable phase including $SiO_2$.

The glass and glass-ceramic compositions of the disclosure that are substantially reactive to a refractory material can degrade such materials according to at least two mechanisms. First, for refractory materials that are classified as refractory ceramics (e.g., silica, zirconia, alumina and combinations thereof), these materials can be dissolved by glass compositions that are very fluid at melting temperatures and possess a large amount of fluxes and/or low temperature glass formers (e.g., $B_2O_3$ and $P_2O_5$) compared to higher temperature glass formers (e.g., $SiO_2$ and $Al_2O_3$). Glass compositions with high amounts of alkali metals, alkaline earth metals, boron, phosphates, halides and metal oxides compared to silica and alumina often are substantially reactive to ceramic refractories (but perhaps not reactive to precious metal, refractory materials). That is, if a glass is 'starved' of silica and alumina by having larger quantities of low temperature glass formers and/or fluxes, the glass will tend to pull it from any refractory coming in contact with it.

For example, the Cu-containing AM glass compositions typically contain about 20 to 40% copper oxide in order to obtain antimicrobial behavior, including bacterial, viral and/or fungi kill levels commensurate with log reduction levels of "3 log" or more. As these glasses typically have silica levels below 70 mol %, they are substantially reactive with conventional refractory materials. Other substantially reactive glasses include high refractive index ophthalmic glasses. To achieve high refractive indices in these glasses, heavy metal elements are incorporated into the glass matrix such as barium, lead, lanthanum, germanium and niobium. Additional alkali metals and alkaline earth metals are added to ensure that such glasses will melt at reasonable temperatures, ensuring that these glasses have relatively low silica levels, typically about 40% by weight or less.

On the other hand, most commercially available glass compositions with silica concentrations of around 70 wt. % or more are not substantially reactive to conventional refractory materials classified as refractory ceramics. For example, soda-lime glass typically includes about 70% silica by weight, 15% sodium oxide and 9% calcium oxide and is not substantially reactive to conventional refractory materials. Similarly, Corning® Pyrex® glass has a silica content of about 81% by weight, along with boron oxide at 13.2% by weight, alumina at 2.3% by weight and is also not substantially reactive to conventional refractory materials.

Second, for refractory materials that are classified as precious metals (e.g., platinum, platinum alloys, gold and others), the corrosion mechanism for the substantially reactive glass and glass-ceramic compositions of the disclosure involves the reduction of multivalent ions (e.g., Fe, Cr, Mn, Cu, Sn, Sb, As, Se, and Ag) within the glass or glass-ceramic composition that can alloy with the precious metal and lower its melting point. If the melting point of the precious metal is reduced to a temperature that is below the temperature of the melted batch of the glass or glass-ceramic composition in a melting apparatus, the precious metal will decompose and end up mixed within the melted batch of the glass or glass-ceramic composition. When the multivalent ions are at relatively low levels of about 1 weight percent or less, they may alloy with the precious metal refractory materials (e.g., a furnace lining) and melt within the structure having the precious metal refractory material with little to no negative impact. On the other hand, when the multivalent ions are included at higher levels of more than 1 weight percent within a glass or glass-ceramic composition, these compositions are substantially reactive—i.e., they can alloy with the precious metal refractory material and easily destroy the structure fabricated from the precious metal refractory material (e.g., a furnace lining).

For example, Cu-containing AM glass compositions with copper levels far exceeding 1 weight percent are substantially reactive to precious metal-containing refractory materials. When melted in contact with precious metal-containing refractory materials (e.g., furnace linings), the Cu-containing AM glass compositions can alloy with the precious metals and significantly lower their melting point leading to degradation and corrosion of structure fabricated from the precious metals during melting of these glasses for purposes of processing and manufacturing. As another example, high antimony glasses employed in fiber amplifier applications typically contain antimony levels of about 20 weight percent. As such, if the antimony in the glass is reduced, it is likely to alloy with any refractory materials containing precious metals, leading to premature destruction of the structure containing the precious metals in contact with the glass during processing.

Referring to FIG. 1, a submerged combustion melting apparatus 100 is depicted according to an aspect of the disclosure. The SCM apparatus 100 includes a melting vessel 10 for preparing a melted batch 20, which has a glass or glass-ceramic composition that is substantially reactive to a conventional refractory material. In some aspects, the conventional refractory material can comprise one or more of silica, zirconia, alumina, platinum and platinum alloys. The melting vessel 10 of the SCM apparatus 100 can take on a variety of shapes, sufficient for accommodating various volumes of melted batch 20. As depicted in FIG. 1, the vessel 10 is fabricated in a rectangular cuboid shape with four (4) planar-shaped walls 12 and a floor 14. Other suitable forms for vessel 10 include cylindrical shapes with one (1) wall 12, various cuboid shapes, typically with four (4) planar-shaped walls, and other variations of these shapes.

The walls 12 and floor 14 of the melting vessel 10 of the SCM apparatus 100 depicted in FIG. 1 include water-cooling elements, along with associated conduits and controllers (not shown), for cooling the walls and floor of the vessel 10 during operation of the SCM apparatus 100. Other liquid cooling media, besides water, can be employed in the cooling elements of the walls 12 and floor 14 as understood by those skilled in the field. Further, the walls 12 and floor 14 can be fabricated from various metals and metal alloys that provide sufficient structural integrity for the vessel 10, and also can be fabricated to accommodate the cooling elements. As also shown in FIG. 1, the walls 12 and floor 14 also include a liner 15 that is generally in contact with the melted batch 20. In some embodiments, the liner 15 is fabricated from a conventional refractory material that includes one or more of silica, zirconia, alumina, platinum and platinum alloys. Liner 15 can also be fabricated from other conventional refractory materials suitable for melting glass and glass-ceramic compositions.

Collectively, the walls 12, floor 14 and liner 15 of the melting vessel 10 employed by the SCM apparatus 100 allow for the formation of a skull layer 20a between the melted batch 20 and the liner 15. In particular, the walls 12 and floor 14 of the vessel 10 are cooled by the water-cooling elements such that the melted batch 20 is cooled below its melting point in proximity to the liner 15. As such, the skull layer 20a is a solid, skin of the melted batch 20, serving as a protective barrier between the melted batch 20 having a substantially reactive glass or glass-ceramic composition and the liner 15, which is fabricated from a conventional refractory material. In certain aspects, the skull layer 20a developed in the SCM apparatus 100 can range in thickness from about 0.1 to about 5 inches in thickness, e.g., about 0.5 inches, 1 inch, 1.5 inches, 2 inches, 2.5 inches, 3 inches, 3.5 inches, 4 inches, 4.5 inches, 5 inches and all thickness values between these amounts.

Referring again to FIG. 1, the melting vessel 10 is depicted in exemplary form with a port 30 in one of the walls 12 for conveying a batch of raw materials 34 below the glass line 22 of the melted batch 20. In other embodiments (not shown), the port 30 is situated above the glass line 22. In other aspects consistent with the depiction in FIG. 1, the port 30 is situated at a location about 1 to 20 inches below the glass line 22. Preferably, the port 30 is situated at a location about 2 to 10 inches below the glass line 22. The batch of raw materials 34 includes the constituents for the glass or glass-ceramic composition of the melted batch 20. As shown in FIG. 1, the port 30 includes an auger 32 for moving the raw materials 34 into the melted batch 20. Port 30 can include various mechanical or electro-mechanical features or elements to drive the raw materials 34 into the melted batch 20. Advantageously, the forced delivery of the raw materials 34 into the melted batch 20 below the glass line 22 (e.g., by an auger 32) ensures that the raw materials 34 are mixed and melted within the melted batch 20 without direct exposure to the liner 15 above the glass line 22 in a melted form. Below the glass line 22, the liner 15 is protected by a skull layer 20a formed directly from the melted batch 20 itself within the vessel 10. As such, the arrangement of the SCM apparatus 100 with a port 30 that delivers a batch of raw materials 34 below the glass line 22 eliminates, or at a minimum, significantly reduces degradation to the liner 15 of the vessel 10. For those embodiments of the vessel 10 with a port 30 above the glass line 22, the port 30 can be configured to minimize exposure of the raw materials 34 to the liner 15 above the glass line 22 by ensuring that the raw materials 34 are displaced from liner 15 as they are forced into the vessel 10 and into the melted batch 20.

As also depicted in FIG. 1 in exemplary form, the SCM apparatus 100 includes a single burner 40 within the floor 14 of the melting vessel 10. Other configurations of the SCM apparatus 100 can employ multiple burners within the floor 14 of the vessel 10, depending on the size of the vessel 10 and space available for one or more delivery orifice assemblies 300. The burner 40 is configured to direct a flame 42 with sufficient energy into a batch of raw materials 34 in the vessel 10 to form a melted batch 20. Similarly, the burner 40 continues to provide a flame 42 into the melted batch 20 as additional batches of raw materials 34 are fed into the melted batch 20 through the port 30. Other components (not shown) for controlling the burner 40 and flame 42 are configured within or coupled to the SCM apparatus 100 as understood by those skilled in the field. The configuration of the burner 40 such that it can directly provide a flame 42 directly into the melted batch 20 affords the SCM apparatus 100 with advantages over other conventional melting apparatus. The direct exposure of the melted batch 20 to a flame 42 from the burner 40 ensures that maximum input energy is delivered directly to the raw materials 34 to form the melted batch 20 at a high efficiency. Further, the direct exposure of the melted batch 20 to the flame 42 ensures that the melted batch 20 is mixed and agitated to avoid segregation and ensure a high degree of homogeneity in the melted batch 20. Still further, the direct exposure of the melted batch 20 to the flame 42 allows for oxidation or reduction of the metal(s) in the batch of raw materials 34 and the melted batch 20 as desired, depending on the fuel-to-oxygen ratios employed by the burner 40 in producing the flame 42.

Figure 3A:
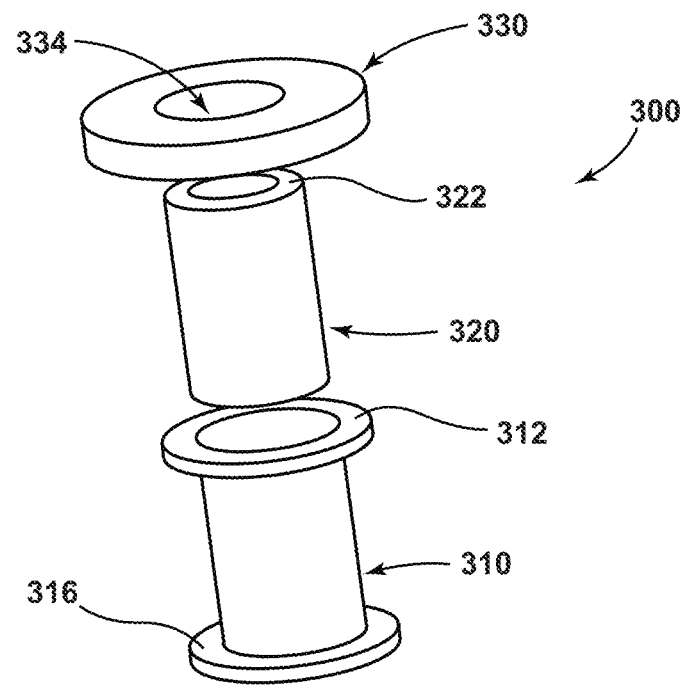
FIG. 3A is an exploded, schematic view of a delivery orifice subassembly according to an aspect of the disclosure.

Referring again to FIG. 1, the SCM apparatus 100 also includes a delivery orifice assembly 300 in the floor 14 of the melting vessel 10. The delivery orifice assembly 300 is configured to deliver the melted batch 20 from the vessel 10 into a containment vessel 50. In certain embodiments, the delivery orifice assembly 300 is heated for the controlled delivery of the melted batch 20 into the containment vessel 50. Various heating and cooling arrangements can be employed with the delivery orifice assembly 300 to control the viscosity of the melted batch 20 such that it flows at a controlled rate into the containment vessel 50 including but not limited to induction, resistive winding, burner with air purge, and direct fired metal with adaptive cooling. More particularly, the location and configuration of the delivery orifice assembly 300 in the floor 14 in proximity to the burner 40 of the vessel 10 allows the SCM apparatus 100 to maintain a sufficiently continuous skull layer 20a to protect the liner 15 from degradation from the melted batch 20 while also ensuring that the assembly 300 penetrates the water-cooled floor 14 such that a skull layer 20a does not form over it. The delivery orifice assembly 300 can then deliver the melted batch 20 to a containment vessel 50 through a localized reduction in viscosity of the melted batch 20 in close proximity to the assembly 300. By situating the delivery orifice assembly 300 in the floor 14 (rather than in a wall 12, for example), gravity can be used to assist in the flow of the melted batch 20 into the containment vessel 50. In contrast, situating a delivery orifice assembly in a wall of the SCM apparatus is not preferred as doing so would significantly increase the likelihood of a skull layer forming over the orifice of the assembly. Further engineering adjustments would be necessary to ensure flow of the melted batch, such as adding an extension of the inner liner (e.g., inner liner 320 as shown in FIG. 3A) of the delivery orifice assembly into the melting vessel 10. Yet this extension of the inner liner would be exposed to the substantially reactive melted batch and therefore degrade in a short period of time. Consequently, the delivery orifice assembly 300 should be located in the floor 14 in proximity to the burner 40 to optimize functionality. As a result, the degree of local viscosity reductions in the melted batch 20 (i.e., through heating by the delivery orifice assembly 300) necessary for flow of the melted batch are reduced, which aids in the preservation of the skull layer 20a. Further, by situating the delivery orifice assembly 300 in the floor 14 in relative proximity to the burner 40 and flame 42, the delivery orifice assembly 300 can take advantage of the localized heat from the flame 42 and its penetration through the water-cooled floor 14 to promote or arrest flow of the melted batch 20 into the containment vessel 50 while preserving the integrity of the skull layer 20a in the remainder of the vessel 50.

Still referring to FIG. 1, the containment vessel 50 of the SCM apparatus 100 can take on a variety of forms for batch runs or periodic runs. For example, vessel 50 can be a mold with graphite walls for receiving the melted batch 20 and molding it into a desired shape, e.g., a plate. Vessel 50 can also be a containment apparatus for holding water such that melted batch 20 is delivered directly into the water within the vessel 50 (e.g., as shown schematically in FIG. 1). The containment vessel 50 can also be an apparatus that includes water-cooled rollers for receiving the melted batch 20 and rolling it into a desired shape, e.g., a continuous plate, prior to being sectioned by a downstream cutting apparatus (not shown).

Figure 1A:
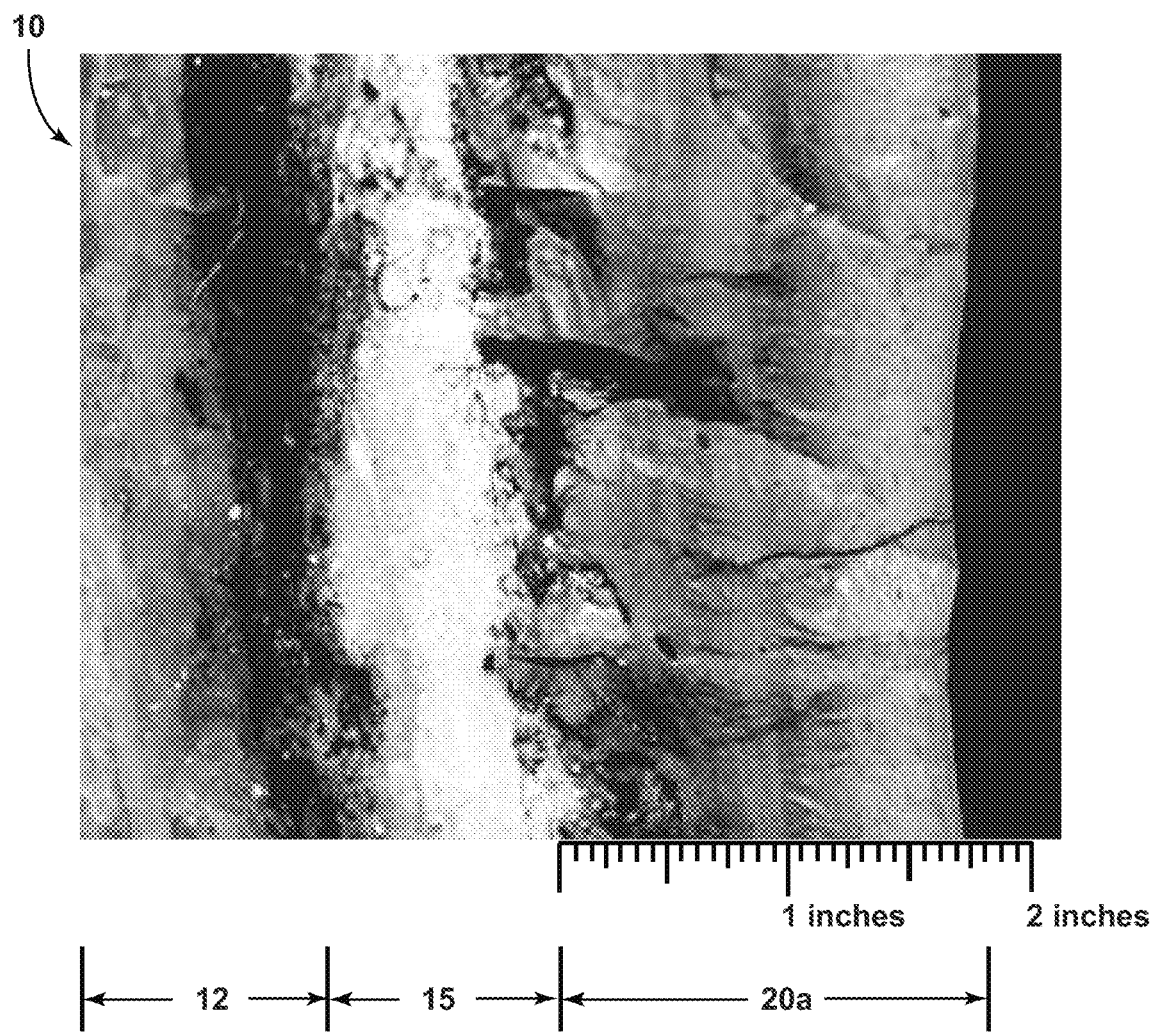
FIG. 1A is a cross-sectional, optical micrograph of a wall of a submerged combustion melting apparatus after a method of melting a phase-separable, copper-containing glass according to an aspect of the disclosure.

Referring now to FIG. 1A, a cross-sectional, optical micrograph of a wall 12 of the melting vessel 10 of an SCM apparatus 100 is depicted after the completion of a periodic or batch run employed to form a melted batch 20 of a phase-separable, copper-containing antimicrobial glass composition. As shown in FIG. 1A, the wall 12 includes a liner 15 fabricated from alumina, a conventional refractory material. Further, FIG. 1A shows that a skull layer 20a of the phase-separable, copper-containing antimicrobial glass composition has formed over the liner 15, thus protecting it from substantial degradation from the copper-containing antimicrobial glass composition. More particularly, an initial melted batch 20 must first be formed in the vessel 10 of the SCM apparatus 100 to form the skull layer 20a. Hence, some limited degradation to the liner 15 can occur during the initial formation of the skull layer 20a. But after the skull layer 20a has been formed, it will provide resistance to further degradation of the liner 15 during continued operation of the SCM apparatus 100.

In some aspects, the skull layer 20a shown in FIGS. 1 and 1A can be mechanically removed from the vessel 10 prior to subsequent use of the SCM apparatus 100 or a rebuild of the apparatus. Such an approach may be warranted if the SCM apparatus 100 is used to melt various glass and glass-ceramic compositions over time. In other aspects, the skull layer 20a is left on the liner 15 of the vessel 10 before and after repeated use of the SCM apparatus 100.

Figure 2:
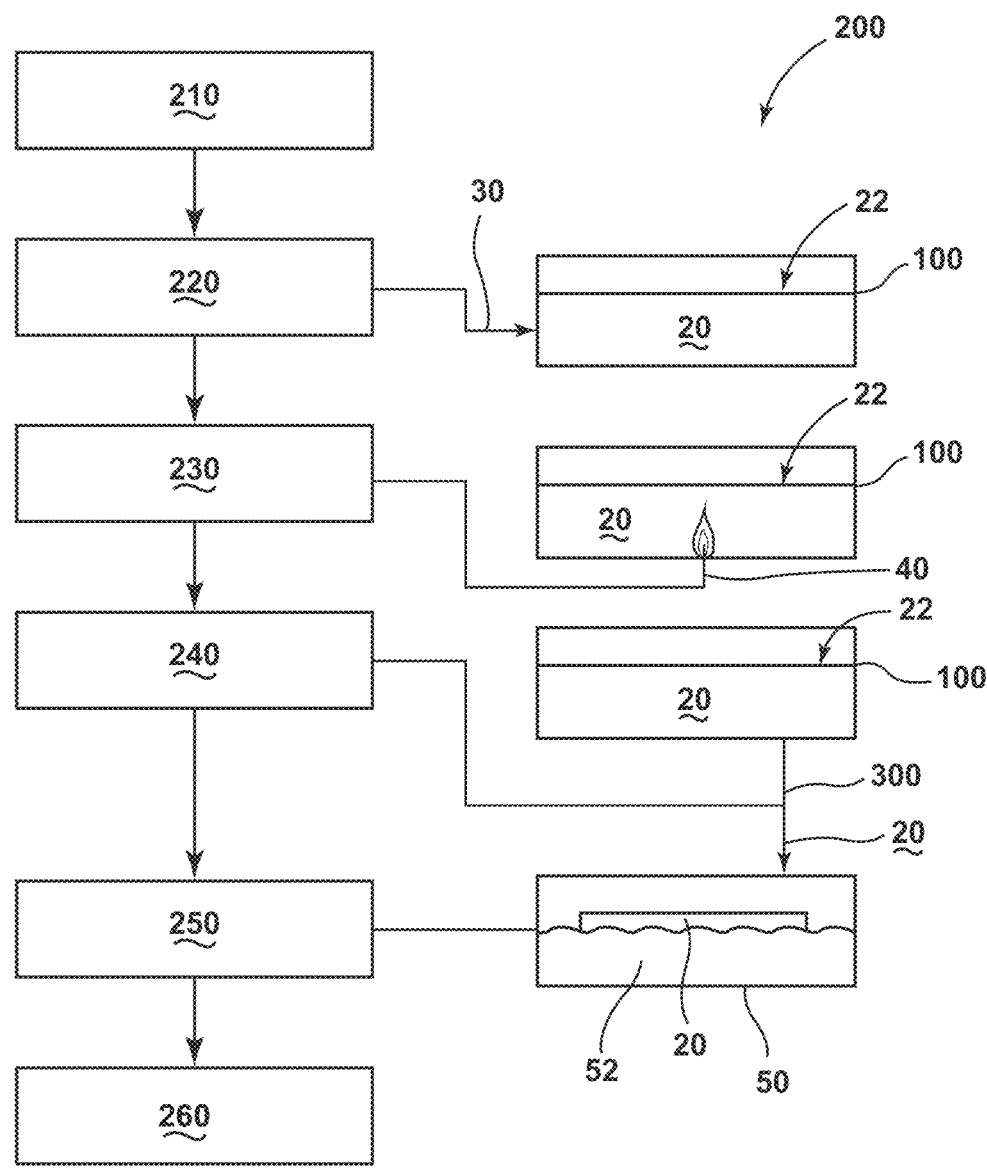
FIG. 2 is a schematic flow chart of a method of melting glass and glass-ceramics according to an aspect of the disclosure.

Referring to FIG. 2, a method 200 of melting glass and glass-ceramics, particularly glass and glass-ceramic compositions that are substantially reactive to conventional refractory materials, e.g., as including one or more of silica, zirconia, alumina, platinum and platinum alloys, is provided. The method 200 includes a conveying step 220 for conveying a batch of raw materials (e.g., raw materials 34 shown in FIG. 1) into an SCM apparatus 100 via a port 30 below a glass line 22 of a melted batch 20. As noted earlier, the delivery of raw materials below the glass line 22 of the melted batch 20 provides advantages, including additional mixing of the raw materials and protection of the skull layer developed in the SCM apparatus 100 during the method 200. In some implementations, however, the conveying step 220 is conducted such that a batch of raw materials is conveyed into the SCM apparatus above the glass line 22, e.g., with an SCM apparatus configuration in which the port 30 is situated above the glass line 22 of the melted batch 20. In other aspects, the conveying step is conducted such that the batch of raw materials is forced into the melted batch 20 through the port 30 by mechanical or electro-mechanical means including but not limited to an auger apparatus.

The method 200 of melting glass and glass-ceramics depicted in FIG. 2 optionally includes a preparing step 210 of preparing the batch of raw materials for conveyance into the SCM apparatus 100 in step 220. The preparing step 210, in particular, can include weighing and mixing the raw materials for the intended glass or glass-ceramic composition of the melted batch 20. For certain particularly reactive compositions, such as phase-separable, copper-containing antimicrobial glass, the raw materials can be isolated to avoid cross-contamination with raw materials from other glass and glass-ceramic compositions or other glass and glass-ceramic compositions in final or near-final form. Further, the preparing step 210 can further include transporting the raw materials to the SCM apparatus 100 by sacks, vessels or other containers suitable for this function, as understood by those with ordinary skill in the field of this disclosure.

Referring again to FIG. 2, the method 200 of melting glass and glass-ceramics includes a directing step 230 for directing a flame (e.g., flame 42 depicted in FIG. 1) from a burner 40 of the SCM apparatus 100 into the batch of raw materials and the melted batch 20 with sufficient energy to form the raw materials into the melted batch 20. As noted earlier, the direct exposure of the melted batch 20 to a flame from the burner 40 ensures that maximum input energy is delivered directly to the raw materials 34 (see FIG. 1) to form the raw materials into the melted batch 20 at a high efficiency. Further, the direct exposure of the melted batch 20 to the flame ensures that the melted batch 20 is mixed and agitated to avoid segregation and ensure a high degree of homogeneity in the melted batch 20. Still further, the direct exposure of the melted batch 20 to the flame allows for oxidation or reduction of the metal(s) in the batch of raw materials 34 and the melted batch 20 as desired, depending on the fuel-to-oxygen ratios employed by the burner 40 in producing the flame.

In certain aspects of the method 200, the directing step 230 for directing a flame into the batch of raw materials and the melted batch 20 can be conducted with sufficient energy to agitate the melted batch 20 such that the melted batch in the containment vessel (e.g., vessel 50 depicted in FIG. 1) is substantially homogeneous. The directing step 230 can also be conducted according to a ratio of oxygen to fuel that is set based at least in part on an oxidation state of at least one metal (e.g., copper) in the glass or glass-ceramic composition of the melted batch 20. Further, the fuel employed in the directing step 230 of directing a flame into the batch of raw materials and the melted batch 20 can be natural gas, and the ratio of oxygen to natural gas can be set from about 2:1 to about 3:1. In other aspects, the directing step 230 of directing a flame (e.g., flame 42 as shown in FIG. 1) into the batch of raw materials and the melted batch 20 can include other combustion gases such as hydrogen and propane, along with other inert gases such as argon and nitrogen.

According to a preferred aspect of the method 200 of melting glass and glass-ceramics, the conveying and directing steps 220 and 230 are conducted such that the melted batch 20 includes a skull layer 20a (see FIGS. 1 and 1A) in contact with the walls 12 and floor 14 of the melting vessel 10 of the SCM apparatus 100. In particular, the walls 12 and floor 14 of the vessel 10 can be cooled by water-cooling elements in proximity to the walls and floor during the conveying and directing steps 220 and 230 such that the melted batch 20 is cooled below its melting point in contact with or in close proximity to a refractory liner (e.g., liner 15 as depicted in FIG. 1) over the walls 12 and floor 14 of the melting vessel 10. As such, the skull layer 20a can be formed during the conveying and directing steps 220 and 230 as a solid, skin of the melted batch 20. Further, an initial skull layer (or a portion of the skull layer 20a) can be initially formed upon an initial melt of the raw materials 34 in the vessel 50 in forming the melted batch 20 prior to the conveying and directing steps 220 and 230 of the method 200. The skull layer 20a serves as a protective barrier between the melted batch 20, which has a substantially reactive glass or glass-ceramic composition, and the liner 15, which is fabricated from a conventional refractory material. In certain aspects, the skull layer 20a developed according to the method 200 can range in thickness from about 0.1 to about 5 inches in thickness, e.g., about 0.5 inches, 1 inch, 1.5 inches, 2 inches, 2.5 inches, 3 inches, 3.5 inches, 4 inches, 4.5 inches, 5 inches and all thickness values between these amounts.

The method 200 of melting glass and glass-ceramics shown in FIG. 2 also includes a heating step 240 for heating a delivery orifice assembly 300 located at the bottom or floor of the SCM apparatus 100 to convey the melted batch 200 through the orifice assembly into a containment vessel 50. Various heating and cooling arrangements can be employed in the heating step 240 to control the viscosity of the melted batch 20 in proximity to the delivery orifice assembly 300 such that it flows at a controlled rate into the containment vessel 50. These heating arrangements include but are not limited to induction, resistive winding, burner, and direct fired (e.g., by transmitting a current through a resistive metal such as platinum). Further, in some aspects, the heating step 240 can be conducted to convey the melted batch 20 through the delivery orifice assembly 300 into cooling media 52 (e.g., water) within the containment vessel 50.

As noted earlier, the provision of conveying the melted batch 20 through the delivery orifice assembly 300 in the floor 14 of the vessel 10 allows the method 200 to employ the SCM apparatus 100 to maintain a sufficiently continuous skull layer 20a to protect the refractory liner and furnace components of the SCM apparatus 100 from degradation from the melted batch 20 while balancing the need to deliver the melted batch 20 to a containment vessel 50 through a localized reduction in viscosity of the melted batch 20 in proximity to the delivery orifice assembly 300. In certain aspects of the method 200, the heating step 240 for heating a delivery orifice assembly 300 is conducted with an induction heating process. In another implementation of the method 200, the delivery orifice assembly 300 employed in the heating step 240 is lined with a tin oxide liner element.

As also depicted in FIG. 2, the method 200 of melting glass and glass-ceramics can include an optional rolling step 250 when the method 200 is conducted in a continuous fashion. For example, melted batch 20 can be subjected to the rolling step 250 by conveying the melted batch 20 through water-cooled rollers (not shown) and rolling it into a desired shape, e.g., a continuous plate, prior to being sectioned by a downstream cutting apparatus (not shown). Further, an optional processing step 260 can be conducted according to the method 200 to dry and then size the rolled melted batch 20 into final or near-final forms.

In an additional aspect of the method 200 of melting glass and glass-ceramics, the conveying, directing and/or heating steps 220-240 are further controlled such that the melted batch 20 is continuously conveyed into the containment vessel 50 (e.g., as a continuous plate or sheet). In another aspect of the method 200 of melting glass and glass-ceramics, the conveying, directing and/or heating steps 220-240 are further controlled such that the melted batch 20 is periodically conveyed into the containment vessel 50 (e.g., in batches). As noted earlier, the containment vessel 50 employed in the method 200 can take on a variety of forms, depending on the arrangement of the SCM apparatus 100 for batch runs or periodic runs.

In certain aspects of the method 200 of melting glass and glass-ceramics, the glass and glass-ceramic compositions of the melted batch 20 are substantially reactive to conventional refractory materials, e.g., as including one or more of silica, zirconia, alumina, platinum and platinum alloys. For example, the method 200 can be employed to form a melted batch 20 in which the glass or glass-ceramic composition includes a copper-containing oxide. In a preferred aspect, the method 200 is employed to form a melted batch 20 in which the glass or glass-ceramic composition is an antimicrobial glass composition comprising a copper-containing oxide in the range from about 10 to about 50 mol %. Further, the directing step 230 for directing a flame can be conducted according to a ratio of oxygen to fuel that is set based at least in part on an oxidation state of the copper in the antimicrobial glass composition.

Figure 3B:
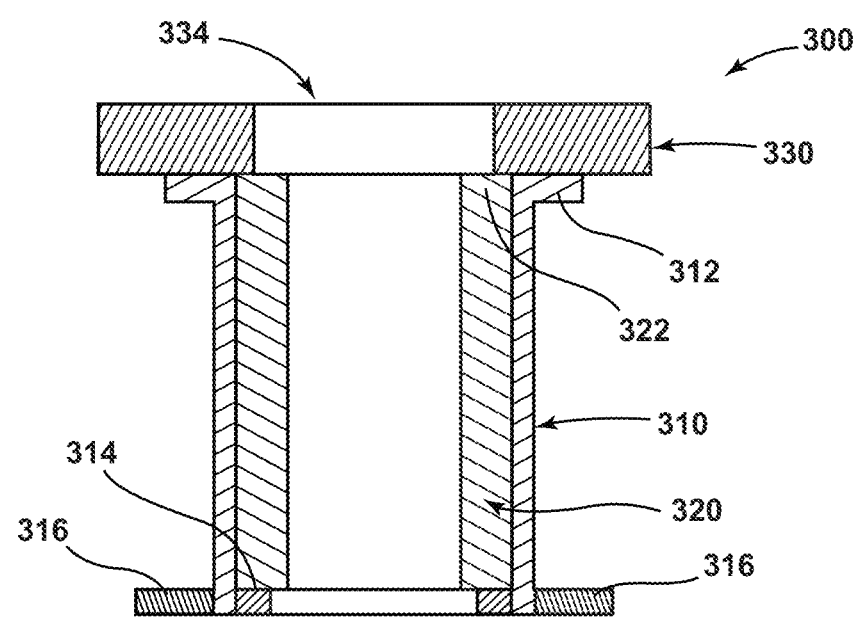
FIG. 3B is a cross-sectional, schematic view of the delivery orifice subassembly depicted in FIG. 3A.
Figure 3C:
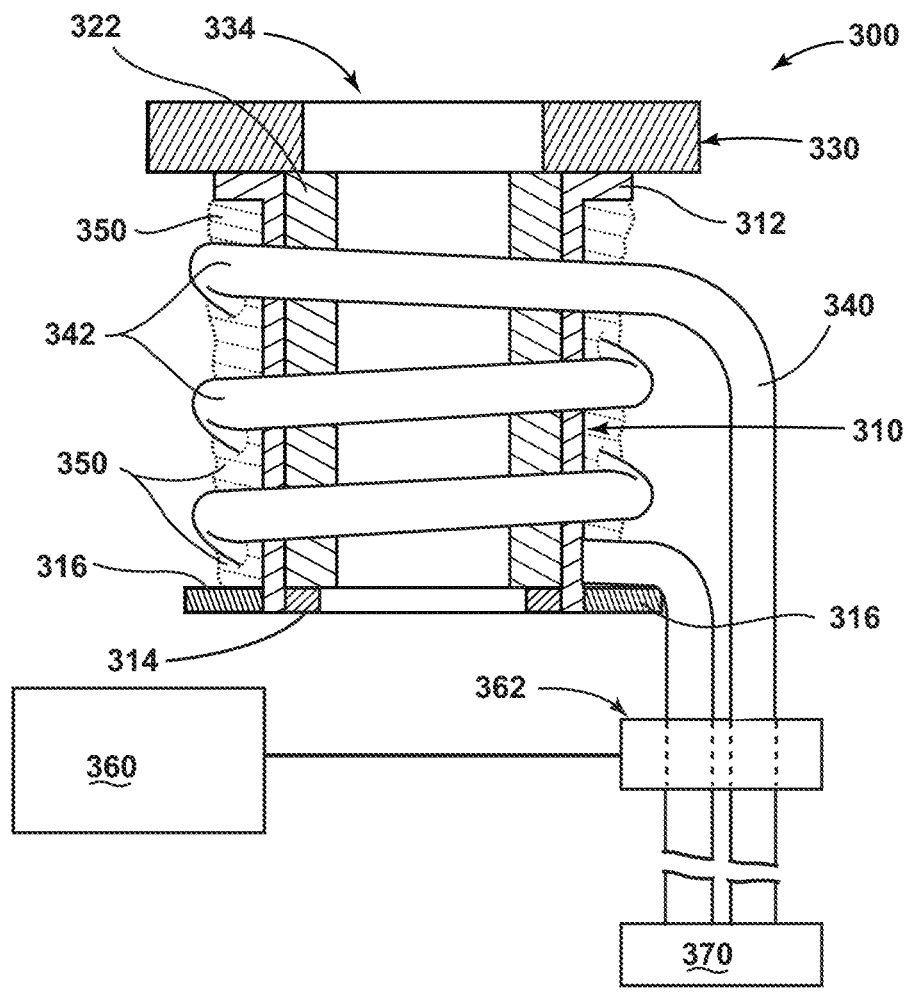
FIG. 3C is a cross-sectional, schematic view of a delivery orifice assembly that includes the delivery orifice subassembly depicted in FIG. 3A.

Referring now to FIGS. 3A-3C, a delivery orifice assembly 300 for conveying a melted batch from an SCM apparatus having a glass or glass-ceramic composition is depicted according to an aspect of the disclosure. In certain aspects, the glass or glass-ceramic composition is substantially reactive to a refractory material that includes one or more of silica, zirconia, alumina, platinum and platinum alloys. The delivery orifice assembly 300 includes a susceptor sleeve 310 comprising a sleeve end 312 for coupling to an SCM apparatus (e.g., the floor 14 of an SCM apparatus 100 as shown in FIG. 1). In some embodiments, the susceptor sleeve 310 can be fabricated from a steel, a precious metal, a precious metal alloy, a metal alloy, and other high temperature resistant materials suitable for use as a susceptor in an induction heating arrangement.

Referring again to FIGS. 3A-3C, the susceptor sleeve 310 can, in some aspects, have an internal diameter that ranges from about 0.5 to 4 inches, a wall thickness from about 0.02 to 0.50 inches and a height that ranges from about 0.5 to 20 inches. For example, the internal diameter of the susceptor sleeve 310 can be 0.5 inches, 0.6 inches, 0.7 inches, 0.8 inches, 0.9 inches, 1 inch, 1.5 inches, 2 inches, 2.5 inches, 3 inches, 3.5 inches, 4 inches, and all diameters in between these values. With regard to the wall thickness of the susceptor sleeve 310, for example, it can be 0.02 inches, 0.04 inches, 0.06 inches, 0.08 inches, 0.1 inches, 0.2 inches, 0.3 inches, 0.4 inches, 0.5 inches, and all thickness values between these values. The height of the susceptor sleeve 310, for example, can be 0.5 inches, 1 inch, 2 inches, 3 inches, 4 inches, 5 inches, 6 inches, 7 inches, 8 inches, 9 inches, 10 inches, 12 inches, 14 inches, 16 inches, 18 inches, 20 inches, and all height values between these values. In a preferred aspect, the susceptor sleeve 310 has an internal diameter from about 0.5 to 1.5 inches, a thickness from about 0.05 to about 0.15 inches and a height of about 1 to 2.5 inches. In another preferred aspect, the susceptor sleeve 310 is fabricated from platinum and the wall thickness can be set from about 0.025 to 0.05 inches to balance structural rigidity with increased induction heating response time. That is, a thinner wall thickness for the platinum susceptor sleeve 310 can improve induction heating response time, but at least some thickness is necessary to preserve mechanical integrity of the sleeve within the SCM apparatus 100.

The delivery orifice assembly 300, as shown in FIGS. 3A-3C, also includes a coil 340 that surrounds the susceptor sleeve 310. The coil 340 is configured as both an inductor and as a liquid coolant conveyance. In certain aspects, copper tubing (e.g., ⅜" copper tubing) is employed for the coil 340. More particularly, the coil 340 can be coupled to a buss bar 362 that connects to an induction heating controller 360 (e.g., an Ambrell® Easyheat 10 kW heat station) to perform its induction heating function by generating an oscillating magnetic field within the interior of the coil 340 resulting in eddy currents in the susceptor sleeve 310. Similarly, the coil 340 can be coupled to a cooling controller 370 to perform its cooling function. The coil 340 can also include one or more windings 342 (see FIG. 3C). In a preferred aspect, the coil 340 and three windings 342 are joined with the susceptor sleeve 310 with a refractory cement 350 (see FIG. 3C) such that the coil 340 is not in direct physical contact with the susceptor sleeve 310. As such, the refractory cement 350 must be substantially electrically insulative to ensure that there is no electrical coupling between the coil 340 and the susceptor sleeve 310. The susceptor sleeve 310, as depicted in FIGS. 3A-3C, may also contain a flange 316 to provide further support for the coil 340.

As also shown in FIGS. 3A-3C, the delivery orifice assembly 300 includes an inner liner 320 configured within the susceptor sleeve 310. The inner liner 320 will be in contact with the melted batch 20 and, as such, should have a refractory composition. More particularly, the inner liner 320 is configured to convey a melted batch 20 from the SCM apparatus. The inner liner 320 also includes a liner end 322 that is in proximity to, or in contact with, the sleeve end 312 of the susceptor sleeve 310. In a preferred aspect, the susceptor sleeve 310 also includes an inner flange 314, configured such that the inner liner 320 can rest on the inner flange 314.

Referring again to FIGS. 3A-3C, the delivery orifice assembly 300 also includes a top cap 330 that is positioned over the susceptor sleeve end 312 and the liner end 322. The top cap 330 will also be in contact with the melted batch 20 and, as such, should have a refractory composition. The top cap 330 is also configured with an orifice 334 that is substantially coincident with the liner end 322 of the inner liner 320.

In some embodiments, the refractory composition of the inner liner 320 and top cap 330 includes one or more of quartz, tin oxide, chrome oxide, alumina, fused zirconia, zirconia, zirconia-silica, and combinations of these refractories. In a preferred embodiment, the inner liner 320 and the top cap 330 are fabricated from a composition that includes tin oxide.

As such, the induction heating and cooling controllers 360, 370 can be coupled to the coil 340 to inductively heat the susceptor sleeve 310 to control flow of a melted batch 20 through the orifice 334 and the inner liner 320. In particular, the heating controller 360 generates an oscillating magnetic field within the coil 340 which induces eddy currents in the susceptor sleeve 310 to heat it. Induction heating and cooling controllers 360, 370 can be located independent or within the same housing or structure.

Referring again to FIGS. 3A-3C, the delivery orifice assembly 300 can be operated within an SCM apparatus to control the flow of a melted batch of a glass or glass-ceramic composition, particularly a composition that is substantially reactive to conventional refractory materials. For example, the method 200 (see FIG. 2) for melting such glass and glass-ceramics described earlier can be employed to form a melted batch 20 (see FIG. 1) in the melting vessel 10 of an SCM apparatus 100. During the steps of the method 200 required to form the melted batch 20, a cooling controller 370 of the delivery orifice assembly 300 can be configured to maintain flow of coolant through the coil 340 to ensure that the local viscosity of the melted batch 20 in proximity to the orifice 334 is high enough to prevent flow of the melted batch through the orifice.

In certain aspects, the induction heating controller 360 can be set such that the coil 340 is not inductively heated during the formation of the melted batch 20. Upon the development of a melted batch 20 with sufficient volume, the induction heating controller 360 can be adjusted to add power to the system, thereby heating up the susceptor sleeve 310. Heat will then be conducted from the susceptor sleeve 310 to the inner liner 320 and into the melted batch 20. Once the inner liner 320 reaches a temperature sufficient to reduce the viscosity of the melted batch 20 in proximity to the orifice 334 such that flow of the melted batch through the orifice is obtained, the induction heating controller 360 can adjust power to the coil 340 downward to achieve stable flow of the melted batch 20 through the orifice 334. At the same time, coolant flow can be maintained through the coil 340 by the controller 360 to ensure that a skull layer within the SCM apparatus remains intact, affording protection to the furnace lining and components that would otherwise be in direct contact with the melted batch 20. In addition, the flow rates, and control over the flow rates, of the melted batch 20 through the orifice 334 and the inner liner 320 ensures that the melted batch 20 in contact with the inner liner 320 does not significantly degrade or otherwise corrode it.

Still referring to FIGS. 3A-3C, the delivery orifice assembly 300 can also maintain or otherwise control temperature of the melted batch 20 flowing through its orifice 334 in a further implementation. In particular, the induction heating controller 360 can maintain temperature of the melted batch 20 by two means—automatic and manual. In automatic control, a set point is selected by a user, such as temperature, and the power from the controller 360 adjusts up and down to maintain this temperature. As the melted batch 20 flows through the orifice 334, the melted batch itself will be supplying heat so the controller 360 may reduce power "downward." Yet stable flow of the melted batch 20 through the orifice 334 will frequently result in upward and downward fluctuations in the power from the induction heating controller 360. Conversely, in manual control, a specific power output is selected for the controller 360 and the controller 360 remains at this output independent of the temperature measured in the melted batch 20. In addition, the water cooling of the coil 340 via controller 370 is used to adjust flow of the melted batch 20 by increasing or decreasing viscosity of the melted batch running through the inner liner 320, or it can help to create a skull layer 20a within the inner liner 320. Note that the cooling aspect of the orifice assembly 300 does not ensure that the skull layer 20a in the SCM apparatus 100 remains intact because, as noted earlier, the close proximity of the assembly 300 to the burner 40 ensures that there is no skull layer above the orifice 334.

The delivery orifice assembly 300 depicted in exemplary fashion in FIGS. 3A-3C offers substantial advantages. In particular, the assembly 300 offers the ability to rapidly heat and cool the inner liner 320 by induction with minimal response times. This level of control ensures the fast, robust and constant delivery of the melted batch 20 having a glass or glass-ceramic composition from the SCM apparatus. Another key advantage of the delivery orifice assembly 300 is that it can preserve protection of the furnace linings and components in the SCM apparatus in contact with the reactive glass or glass-ceramic composition of the melted batch 20. In particular, the ability of the delivery orifice assembly 300 to simultaneously cool the coil 340, while it is being employed to inductively heat the melted batch 20 in proximity to the orifice 334, ensures that the skull layer in proximity to the orifice assembly 300 (e.g., in the walls 12 and the floor 14) is maintained during flow of the melted batch 20 out of the orifice assembly 300.

Figure 4:
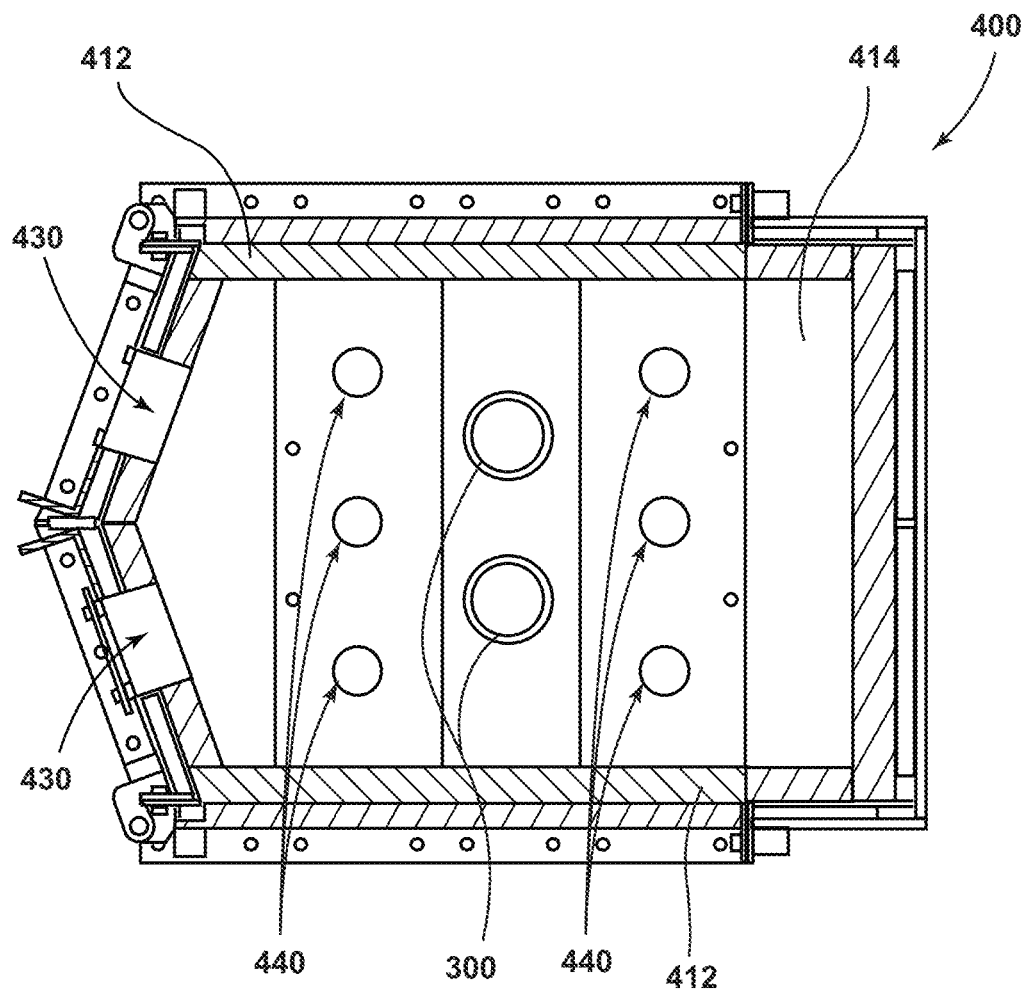
FIG. 4 is a schematic, plan view of a submerged combustion melting apparatus with multiple burners and delivery orifice assemblies according to an aspect of the disclosure.

Other SCM apparatus and delivery orifice assemblies can be configured in view of the aspects of the disclosure. As shown in FIG. 4, for example, an SCM apparatus 400 can be configured with multiple burners 440 and delivery orifice assemblies 300 spaced at various locations, typically within the floor 414 of the apparatus. The SCM apparatus 400 also includes liquid-cooled walls 412 and a floor 414. By positioning multiple burners 440 within the floor 414, the SCM apparatus 400 can be employed to form a melted batch of a glass or glass-ceramic composition, preferably a composition that is substantially reactive to conventional refractory materials, with a high degree of homogeneity. In particular, the multiple burners 440 facilitate more uniform agitation of the melted batch, viscosity uniformity and more uniform oxidation or reduction of the metal constituents within the melted batch.

Further, multiple delivery orifice assemblies 300 can be employed in the SCM apparatus 400 depicted in FIG. 4 to maintain high levels of manufacturing throughput to deliver the melted batch at particular melted batch flow rates, while minimizing the need to excessively reduce the viscosity of the melted batch in proximity to each orifice assembly 300. That is, the use of numerous orifice assemblies 300 compared to a single orifice assembly 300 allows for decreased flow rates through each orifice while achieving the same manufacturing throughput. As a result, the lower flow rates of the melted batch through each of the orifice assemblies 300 can be translated into relatively higher viscosity levels of the melted batch in proximity to each orifice assembly 300. These higher viscosity levels of the melted batch 20 (i.e., as manifested in lower local melted batch temperatures) result in less interference with the solid, skull layer, which plays a role in preserving the furnace linings and components of the SCM apparatus 400 that would otherwise be in direct contact with the melted batch.

Still further, the SCM apparatus 400 depicted in FIG. 4 also can benefit from being configured with multiple ports 430 configured to deliver or otherwise forcefully introduce a batch of raw materials into the melted batch within the apparatus. In particular, multiple ports 430 allow for better control and uniform delivery of the batch of raw materials into the melted batch. An SCM apparatus, such as apparatus 400, with multiple ports 430 can also be configured for higher manufacturing throughput given that larger quantities of batches of raw materials can be delivered into the melted batch by multiple ports 430.

Aspect (1) of this disclosure pertains to a method of melting glass and glass-ceramics, comprising: conveying a batch of raw materials into a submerged combustion melting apparatus, the melting apparatus having liquid-cooled walls and a floor; directing a flame into the batch of raw materials with sufficient energy to form the raw materials into a melted batch; and heating a delivery orifice assembly within the floor of the submerged melting apparatus to convey the melted batch through the orifice assembly.

Aspect (2) of this disclosure pertains to the method of Aspect (1), wherein the melted batch comprises a glass or glass-ceramic composition that is substantially reactive to a refractory material, the refractory material comprising one or more of silica, zirconia, alumina, platinum, and platinum alloys.

Aspect (3) of this disclosure pertains to the method of Aspect (1), wherein the melted batch comprises a glass or glass-ceramic composition comprising silica and copper oxide.

Aspect (4) of this disclosure pertains to the method of any one of Aspects (1) through (3), wherein the melted batch comprises a skull layer in contact with the walls and the floor of the submerged combustion melting apparatus.

Aspect (5) of this disclosure pertains to the method of Aspect (4), wherein the conveying, directing and heating steps are further controlled such that the melted batch is continuously conveyed into the containment vessel.

Aspect (6) of this disclosure pertains to the method of Aspect (4), wherein the conveying step is further conducted such that the batch of raw materials is conveyed below a glass line of the melted batch.

Aspect (7) of this disclosure pertains to the method of any one of Aspects (1) through (6), wherein the step of directing a flame into the batch of raw materials and the melted batch is further conducted with sufficient energy to agitate the melted batch such that the melted batch in the containment vessel is characterized by substantial homogeneity.

Aspect (8) of this disclosure pertains to the method of any one of Aspects (1) through (7), wherein the glass or glass-ceramic composition comprises a copper-containing oxide.

Aspect (9) of this disclosure pertains to the method of Aspect (8), wherein the glass or glass-ceramic composition is an antimicrobial glass composition comprising a copper-containing oxide in the range from about 10 to about 50 mol %.

Aspect (10) of this disclosure pertains to the method of any one of Aspects (1) through (9), wherein the step of directing a flame is conducted according to a ratio of oxygen to fuel that is set based at least in part on an oxidation state of at least one metal in the glass or glass-ceramic composition.

Aspect (11) of this disclosure pertains to the method of Aspect (9), wherein the step of directing a flame is conducted according to a ratio of oxygen to fuel that is set based at least in part on an oxidation state of the copper in the antimicrobial glass composition.

Aspect (12) of this disclosure pertains to the method of Aspect (11), wherein the fuel is natural gas and the ratio is about 2:1 to about 3:1 oxygen gas to natural gas.

Aspect (13) of this disclosure pertains to the method of Aspect (12), wherein the step of heating a delivery orifice assembly is conducted with an induction heating process.

Aspect (14) of this disclosure pertains to the method of Aspect (13), wherein the delivery orifice assembly is lined with a tin oxide liner element.

Aspect (15) of this disclosure pertains to the a delivery orifice assembly for a submerged combustion melting apparatus, comprising: a susceptor sleeve comprising a sleeve end for coupling to a submerged melting apparatus; a coil surrounding the susceptor sleeve that is configured as an inductor and a liquid coolant conveyance; an inner liner having a first refractory composition disposed within the sleeve, the liner further configured to convey a melted batch from the melting apparatus and comprising a liner end in proximity to, or in contact with, the sleeve end; a top cap positioned over the sleeve end and the liner end, the cap having the first refractory composition and configured for contact with the melted batch in the melting apparatus, and the cap further comprising an orifice substantially coincident with the liner end; and an induction heating controller coupled to the coil for inductively heating the susceptor to control flow of the melted batch through the orifice and the inner liner.

Aspect (16) of this disclosure pertains to the delivery orifice assembly of Aspect (15), wherein the melted batch has a glass or glass-ceramic composition.

Aspect (17) of this disclosure pertains to the delivery orifice assembly of Aspect (16), wherein the glass or glass-ceramic composition is substantially reactive to a refractory material, the refractory material comprising one or more of silica, zirconia, alumina, platinum and platinum alloys.

Aspect (18) of this disclosure pertains to the delivery orifice assembly of Aspect (16), wherein the melted batch comprises a glass or glass-ceramic composition comprising silica and copper oxide.

Aspect (19) of this disclosure pertains to the delivery orifice assembly of Aspect (17), wherein the first refractory composition is selected from refractories consisting of quartz, tin oxide, chrome oxide, alumina, fused zirconia, zirconia, zirconia-silica, and combinations of these refractories.

Aspect (20) of this disclosure pertains to the delivery orifice assembly of any one of Aspects (15) through (19), wherein the first refractory composition comprises tin oxide.

Aspect (21) of this disclosure pertains to the delivery orifice assembly of any one of Aspects (15) through (20), wherein the susceptor sleeve has a composition selected from the group consisting of a steel, a precious metal and a precious metal alloy.

Aspect (22) of this disclosure pertains to the delivery orifice assembly of Aspect (21), wherein the susceptor sleeve further comprises an inner flange, and further wherein the inner liner rests on the inner flange.

Aspect (23) of this disclosure pertains to the delivery orifice assembly of Aspect (22), wherein the coil is joined in substantial contact with the susceptor sleeve with a refractory cement.

Aspect (24) of this disclosure pertains to a submerged combustion melting apparatus, comprising: a melting vessel for preparing a melted batch, the vessel comprising a plurality of walls and a floor, each comprising a metal alloy and a water-cooling element; a port in one of the walls for conveying a batch of raw materials into the melted batch; a burner in the floor for directing a flame into the vessel with sufficient energy to form the melted batch; and a delivery orifice assembly in the floor for delivering the melted batch.

Aspect (25) of this disclosure pertains to the submerged combustion melting apparatus of Aspect (24), wherein the delivery orifice assembly comprises: a susceptor sleeve comprising a sleeve end for coupling to the floor of the melting vessel; a coil surrounding the susceptor that is configured as an inductor and a liquid coolant conveyance; an inner liner configured within the sleeve having a first refractory composition, the liner comprising a liner end in proximity to, or contact with, the sleeve end and configured to convey the melted batch from the melting vessel; a top cap positioned over the sleeve end and the liner end, the cap having the first refractory composition and configured for contact with the melted batch in the melting vessel, and the cap further comprising an orifice substantially coincident with the liner end; and an induction heating controller coupled to the coil for inductively heating the coil to control flow of the melted batch through the orifice and the inner liner into the containment vessel.

Aspect (26) of this disclosure pertains to the submerged combustion melting apparatus of Aspect (24), wherein the port is located at a position in one of the walls for conveying the batch of raw materials below a glass line of the melted batch.

Aspect (27) of this disclosure pertains to the submerged combustion melting apparatus of Aspect (25), wherein the first refractory composition is selected from refractories consisting of quartz, tin oxide, chrome oxide, alumina, fused zirconia, zirconia, zirconia-silica, and combinations of these refractories.

Aspect (28) of this disclosure pertains to the submerged combustion melting apparatus of Aspect (27), wherein the first refractory composition comprises tin oxide.

Aspect (29) of this disclosure pertains to the submerged combustion melting apparatus of Aspect (27), wherein the susceptor sleeve has a composition selected from the group consisting of a steel, a precious metal and a precious metal alloy.

It will be apparent to those skilled in the art that various modifications and variations can be made without departing from the spirit or scope of the invention.

What is claimed:

1. A delivery orifice assembly for coupling to a submerged combustion melting apparatus, the delivery orifice assembly comprising:
    a susceptor sleeve comprising walls and a sleeve end configured to receive a molten material;
    a coil surrounding the susceptor sleeve, the coil being configured to:
        inductively heat a volume within the susceptor sleeve; and
        conductively cool the walls of the susceptor sleeve via a heat transfer fluid flowing within the coil;
    an inner liner having a first refractory composition disposed within the susceptor sleeve, the inner liner further configured to convey the molten material from the submerged melting apparatus and comprising a liner end in proximity to, or in contact with, the sleeve end;
    a top cap positioned over the sleeve end and the liner end, the top cap having the first refractory composition and configured to contact the molten material in the submerged melting apparatus, and the top cap further comprising an orifice substantially coincident with the liner end; and
    an induction heating controller coupled to the coil and configured to inductively heat the susceptor sleeve to control a flow of the molten material through the orifice and the inner liner.

2. The delivery orifice assembly of claim 1, wherein the first refractory material comprises one or more of silica, zirconia, alumina, platinum, and platinum alloys.

3. The delivery orifice assembly of claim 1, wherein the first refractory composition is selected from refractories consisting of quartz, tin oxide, chrome oxide, alumina, fused zirconia, zirconia, zirconia-silica, and combinations thereof.

4. The delivery orifice assembly of claim 1, wherein the first refractory composition comprises tin oxide.

5. The delivery orifice assembly of claim 1, wherein the susceptor sleeve has a composition selected from a group consisting of a steel, a precious metal, and a precious metal alloy.

6. The delivery orifice assembly of claim 5, wherein the susceptor sleeve further comprises an inner flange, and the inner liner rests on the inner flange.

7. The delivery orifice assembly of claim 6, wherein the coil is joined in substantial contact with the susceptor sleeve such that:

the coil is in conductive heating communication with the susceptor sleeve and;

the coil is not in electrical communication with the susceptor sleeve.

8. A submerged combustion melting apparatus, comprising:

a melting vessel configured to prepare a molten material, the melting vessel comprising a plurality of walls and a floor, each of the plurality of walls and the floor comprising a metal alloy and a water-cooling element;

a port in one of the walls configured to convey raw materials into the melting vessel;

a burner in the floor configured to direct a flame into the melting vessel with sufficient energy to melt the raw materials into the molten material; and a delivery orifice assembly in the floor configured to deliver the molten material;

wherein the delivery orifice assembly comprises:

a susceptor sleeve comprising walls and a sleeve end configured to be coupled to the floor of the melting vessel;

a coil surrounding the susceptor sleeve, the coil being configured to:

inductively heat a volume within the susceptor sleeve; and conductively cool the walls of the susceptor sleeve via a heat transfer fluid flowing within the coil;

an inner liner configured within the susceptor sleeve having a first refractory composition, the inner liner comprising a liner end in proximity to, or contact with, the sleeve end and configured to convey the molten material from the melting vessel;

a top cap positioned over the sleeve end and the liner end, the top cap having the first refractory composition and configured to contact the molten material in the melting vessel, and the top cap further comprising an orifice substantially coincident with the liner end; and an induction heating controller coupled to the coil configured to inductively heat the coil to control a flow of the molten material through the orifice and the inner liner into a containment vessel.

9. The submerged combustion melting apparatus of claim 8, wherein the port is configured to convey raw materials into the melting vessel at a position below a glass line of the melting vessel.

10. The submerged combustion melting apparatus of claim 8, wherein the first refractory composition is selected from refractories consisting of quartz, tin oxide, chrome oxide, alumina, fused zirconia, zirconia, zirconia-silica, and combinations of these refractories.

11. The submerged combustion melting apparatus of claim 8, wherein the first refractory composition comprises tin oxide.

12. The submerged combustion melting apparatus of claim 8, wherein the susceptor sleeve has a composition selected from a group consisting of a steel, a precious metal, and a precious metal alloy.

* * * * *